2,884,346
Patented Apr. 28, 1959

2,884,346

PRECOOKED STARCH PROCESS INVOLVING SEQUESTERING AGENT

John A. Korth, Hinsdale, Ill., assignor to Corn Products Company, a corporation of New Jersey No Drawing. Application December 24, 1957
Serial No. 704,868

1 Claim. (Cl. 127—32)

This invention relates to the preparation of pregelatinized food starches in dry form, particularly starches of cereal origin, which are entirely free of the so-called "starchy" flavors generally present in starches.

Pregelatinized starches are useful in preparing the so-called "instant" dessert powders, icings, custards, sauces, meringues and similar products for which it is required that the starch be dispersible in warm or cold liquids, such as water or milk. The starches generally employed for such uses in the past have been tuber- or root-type starches, such as potato or tapioca, or waxy cereal starch, such as waxy maize, principally because these generally exhibit much less of the undesirable starchy or pasty flavor commonly found in cereal starches, such as corn starch.

These pregelatinized starches have usually been prepared by roll-drying a suspension or paste of the starch, or spray-drying the same, with or without the addition of one or more supplementary materials, such as sugar, milk, flavoring materials, etc., which alter grinding characteristics or dispersibility and/or disguise the undesirable flavor of the product.

Pregelatinized food starches prepared by previously known methods have several disadvantages depending to some extent on their source. For example, cereal starches, such as corn starch, prepared by roll- or spray-drying suspensions or pastes thereof, usually have an undesirable starchy or cereal flavor immediately after drying and this develops or becomes progressively more pronounced as the product ages, finally taking on a definite rancid character. It is known that dextrose or glucose sirup or sucrose added to the starch prior to drying will retard somewhat the development of these undesirable flavors, but their appearance is delayed only temporarily.

Tuber-type starches or waxy cereal starches, which have comparatively much less tendency toward developing starchy flavors, when reconstituted in water or milk frequently have decidedly less desirable consistencies than the common cereal starches.

The tuber and stem starches and waxy cereal starches which are more acceptable from the standpoint of flavor generally are higher in price than cereal starches. In addition, the supply of such starches may be limited or variable or both.

I have now discovered a means by which it is possible to prepare pregelatinized dry cereal starches, such as corn, wheat, and grain sorghum or mixtures of such starches which have none of the starchy, pasty or rancid flavors generally associated with such products. Unexpectedly I have found that the development of off-flavors and rancidity in the final product may be prevented by gelatinizing and rapidly heat drying the starch and adding to the starch prior to the drying step certain adjuncts. Adjuncts which I have found useful are of the class usually considered as being sequestering agents in that they inactivate metallic ions under specific conditions by forming complexes therewith. Since it is known that certain metallic ions, notably copper and iron, are prooxidants and traces of these ions inevitably are introduced into commercial starches from process waters or equipment, it might be expected that inactivating such ions would prevent rancidity but it was wholly unexpected that the development of the starchy flavor could also be prevented. Apparently the gelatinization and rapid head drying of the starch are also important factors in my invention.

There are a great number of sequestering agents suitable for purposes of my invention. Among the broad general types are aromatic and aliphatic amines, hydroxy acids, dicarboxylic acids, amino acids, condensed inorganic phosphates and certain phenolic compounds. The sequestering agent, which may include mixtures, should be one which itself will not impart any undesirable odor, flavor, and, preferably, color to the starch, and since the ultimate use of the products of my invention is for food purposes, the sequestering agent should be non-toxic. Condensed inorganic phosphates are peculiarly effective and the preferred sequestering agents for purposes of my invention. Condensed inorganic phosphates comprise that group of compounds usually prepared by heating primary or secondary orthophosphates to effect elimination of water and/or polymerization of the phosphate. The products include the following: metaphosphates, as sodium metaphosphate $(NaPO_3)_x$; pyrophosphates, as tetrasodium pyrophosphate, $Na_4P_2O_7$ and sodium acid pyrophosphate, $Na_2H_2P_2O_7$; and the various polyphosphates such as sodium tripolyphosphate, $Na_5P_3O_{10}$. The various orthophosphates are either not sufficiently effective (as in the instances of mono- and disodium orthophosphates), or else introduce a detrimental alkaline flavor (as with trisodium phosphate); hence, these are excluded from the scope of this invention.

The quantity of sequestering agent used in any instance depends upon the particular sequestering agent used, the mineral content of the starch and water to be utilized, and the drying conditions employed; the quantity preferred being in the range between 0.05 percent and 1.0 percent, basis starch dry substance, but as little as 0.005 percent and as much as 5.0 may be used satisfactorily.

The preferred method for preparing pregelatinized starch according to this invention comprises adding the required amount of sequestering agent to the water which is to be used in preparing the product. The raw starch is then added with stirring to give a starch suspension or "starch milk," which is heated until the starch is swelled or gelatinized to the desired degree. The resulting paste is dried on heated rolls or by spray-drying and then is ground in a suitable mill to the desired particle size. A variant of this process consists in suspending the starch in a water solution of the sequestering agent and then passing the suspension over rolls heated to a temperature sufficiently high to gelatinize and dry the starch in a single operation. The process may also be practiced by adding a sugar, flavoring and/or antioxidant material in addition to the sequestering agent to the starch prior to drying by any of the known methods.

When using condensed phosphates, it is advisable to avoid heating to boiling temperatures or to high temperatures for long periods of time since these condensed phosphates revert to orthophosphates, particularly in acid solutions. The orthophosphates are somewhat less effective in binding metallic ions and are not therefore as highly recommended for purposes of the invention as other agents mentioned.

The incorporation of my preferred sequestering agents in a starch suspension or paste prior to the time of drying contributes several advantages:

(1) The dried starch exhibits no starchy, pasty or rancid flavor when removed from the drier, and remains flavor-free for extended periods of time.

(2) When dried on heated rolls the product is recovered as a brittle film or flake which is easily crushed or broken and quite easily ground to fine particle sizes; suspensions or pastes of starch in water alone come off the rolls as a film which is tough and papery or leathery. Such products generally have a low bulk density and are difficult to grind.

(3) Starch (e.g., grain sorghum starch) which contains tannin-like materials often develops a blue or gray color when gelatinized and dried, but such starch dried with a sequestering agent in accordance with my invention does not exhibit off colors.

The invention will be further illustrated by examples which are intended as typical and informative only and in no way limiting the invention.

*Example I*

To 2800 ml. of water there was added 1.8 grams of tetrasodium pyrophosphate. When the pyrophosphate had dissolved completely, 400 grams of grain sorghum starch was added. The starch suspension was heated in a stainless steel beaker in a steam bath with constant stirring until the starch was gelatinized. The paste was stirred at frequent intervals and heating continued until a temperature of about 185° F. was reached. The hot paste was passed over heated stainless steel rolls operating at 80 pounds steam pressure. The speed of the rolls and the distance between them was adjusted to give a product which had a moisture content of about 3.5 percent. The dried material recovered from the rolls was quite brittle and friable and could be reduced to a powder by grinding in a suitable mill, such as a Mikro Pulverizer, constructed of stainless steel. A single pass through the mill produced a powder over 60 percent of which passed through a 270-mesh sieve and over 80 perecnt of which passed through a 200-mesh sieve. The product was white with no suggestion of blue or gray color, was entirely free from starchy, rancid or other flavors and dispersed readily in cold water or milk.

The pH value of the starch produced as above is 8.0; a less alkaline product can be prepared by reducing the pH value of the starch suspension with an organic or mineral acid or an acid reacting salt. A preferred method for preparing a dried product which is neutral (pH 7.0) comprises replacing one-half the tetrasodium pyrophosphate with 0.9 gram disodium acid pyrophosphate in the example above.

*Example II*

Two ounces of tetrasodium pyrophosphate and 2 ounces of disodium acid pyrophosphate were dissolved in 69 gallons of water. When these salts were dissolved completely, 37.5 pounds of grain sorghum starch and 12.25 pounds of sucrose were added. The resulting mixture was stirred constantly while heating in a steam-jacketed stainless steel kettle to a temperature of 195° F. This paste was dried by atomizing into heated air in a conventional spray-dryer. The product, after grinding in a stainless steel mill, was free from off-flavor of any kind, dispersed readily in milk or water and was found particularly suitable for use in "instant" dessert powder formulations.

Continuous cooking of the starch paste, as in a continuous type of heat exchanger sold under the name of "Votator," would be preferable to batch-cooking as described. In some instances, depending upon drying conditions and equipment used, the spray-dried product can be used without grinding. When used in "instant" dessert powders, the spray-dried material was found to produce desserts which were smoother in texture than those containing roll-dried starch.

*Example III*

Two hundred grams of powdered corn starch were suspended in a solution of 0.1 gram ethylenediamine tetraacetic acid (Tetrine acid) in 1400 ml. water. The suspension was heated, dried and ground to a powder as in Example I. The product was white with a yellowish or cream-colored cast and was free from starchy flavor.

*Example IV*

A product was prepared, as in Example I, except that wheat starch was used. The product developed none of the starchy flavor or rancidity which develop in untreated wheat starch.

*Example V*

A chocolate flavored product was prepared using as ingredients:

| | Grams |
|---|---|
| Powdered corn starch | 45.0 |
| Dextrose hydrate | 16.5 |
| Sucrose | 18.0 |
| Salt | 0.6 |
| Vanilla flavoring | 0.9 |
| Cocoa | 18.5 |
| Sodium tripolyphosphate | 0.5 |
| | 100.0 |

These ingredients in 500 ml. water were heated to 190° F., then dried by passing over stainless steel rolls operating at 80 pounds steam pressure. After grinding, this material with added sugar and flavorings was found suitable for use in chocolate flavored "instant" puddings, chocolate icings and similar products being completely devoid of undesirable starchy flavor.

My invention has a number of advantages. It is simple and inexpensive since standard cooking, drying, and grinding equipment can be employed in its practice and the ingredients, both starches and sequestering agents, are readily available at relatively low cost. The products of my invention are equal in flavor to tuber or waxy maize starches, and in some other important respects, particularly consistency, are superior to those starches in particular applications, especially those in which storage periods of indeterminate length may be involved.

My invention is applicable to a variety of starches, such as corn, grain sorghum, wheat, and the like even though the raw starches may be a year or more old. However, it is preferable in order to obtain the maximum benefits of the invention to use freshly milled starches in which undesirable flavors, particularly rancid flavors, have not developed to an appreciable degree.

This application is a continuation-in-part of application Serial No. 421,435, filed April 6, 1954, now abandoned.

I claim:

A process for prevention of rancidity and starchy flavors in dry, pregelatinized starches, which comprises gelatinizing and rapidly heat drying the starch and adding to the starch prior to the drying step 0.005 to 5.0 percent, basis starch dry substance, of a sequestering agent which binds metallic ions as complexes; said sequestering agent being selected from the group consisting of tetrasodium pyrophosphate, disodium acid pyrophosphate, sodium metaphosphate, sodium tripolyphosphate, mixtures thereof, and ethylene diamine tetraacetic acid.

References Cited in the file of this patent

UNITED STATES PATENTS

| 1,773,056 | Meyer | Aug. 12, 1930 |
| 2,009,692 | Hall | July 30, 1935 |
| 2,086,867 | Hall | July 13, 1937 |
| 2,500,179 | Hinz et al. | Mar. 14, 1950 |
| 2,607,692 | Kennedy | Aug. 19, 1952 |
| 2,686,723 | Chaneniclk | Aug. 17, 1954 |
| 2,698,803 | Common | Jan. 4, 1955 |

OTHER REFERENCES

"Versene," Bersworth Chem. Co., Framingham, Mass., Tech. Bull. No. I, 1941 (24 pp.), p. 20f, "Uses" pertinent.